Dec. 16, 1969      D. F. SARGISSON      3,483,676
HELICOPTER ENGINE AIR INLETS
Filed Sept. 29, 1967      2 Sheets-Sheet 1
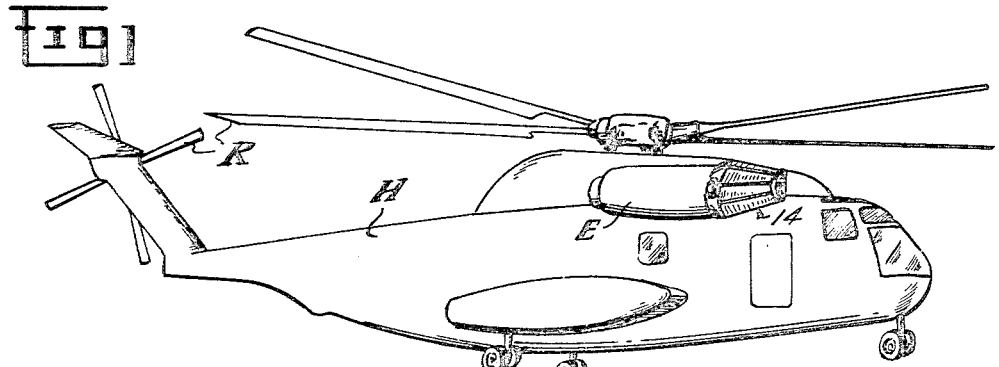
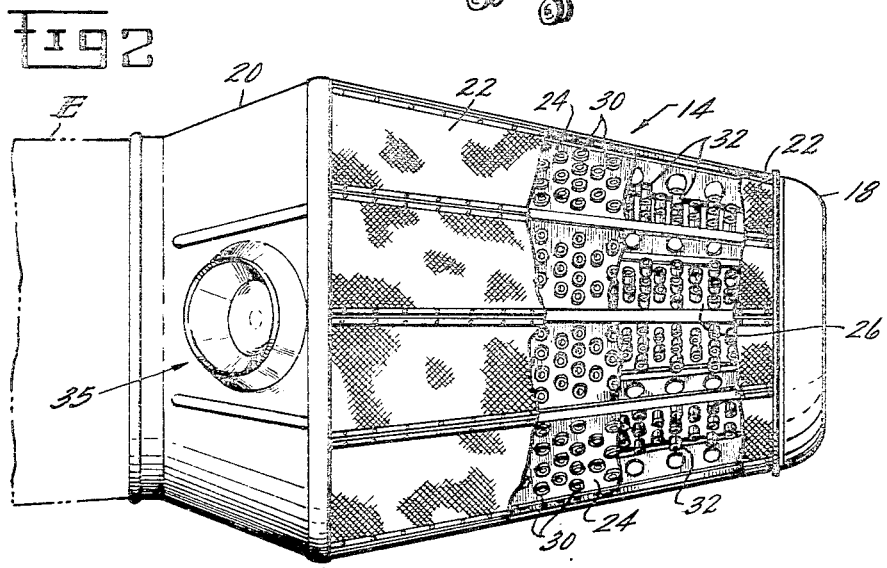
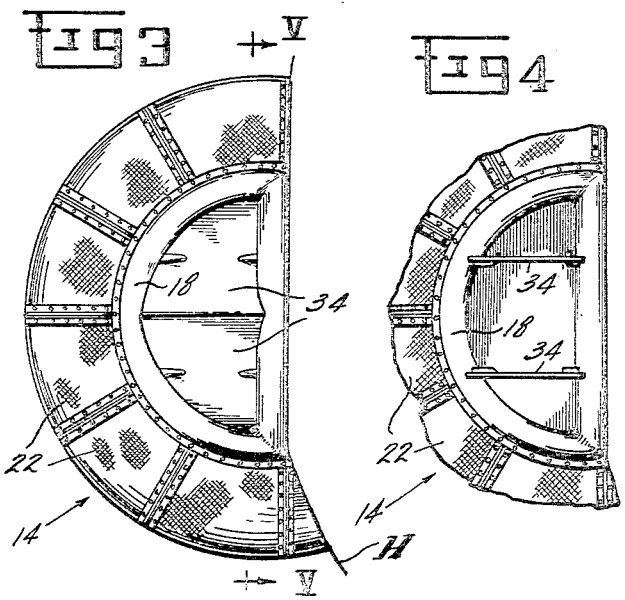
Inventor
DONALD F. SARGISSON
ATTORNEY Dec. 16, 1969  D. F. SARGISSON  3,483,676
HELICOPTER ENGINE AIR INLETS
Filed Sept. 29, 1967  2 Sheets-Sheet 2
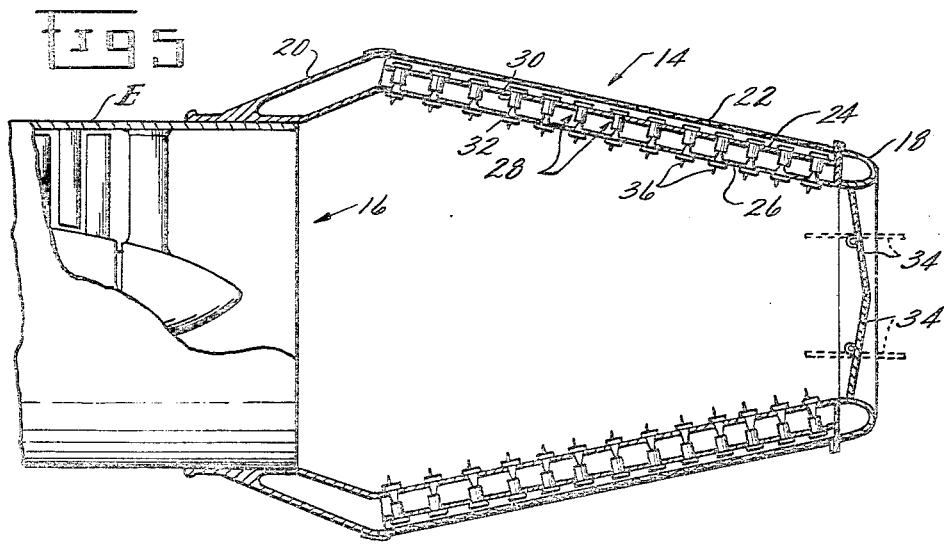
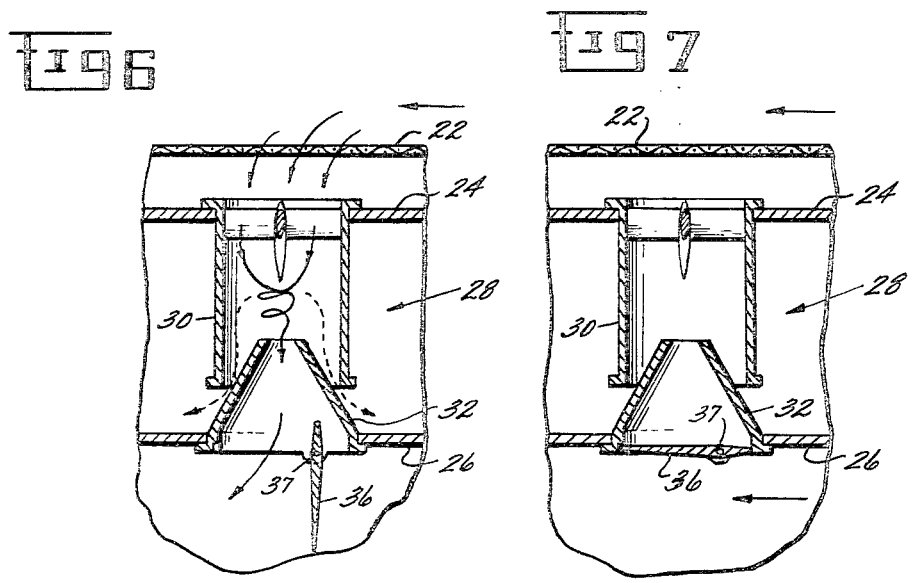
Inventor
DONALD F. SARGISSON
ATTORNEY —

United States Patent Office  3,483,676
Patented Dec. 16, 1969

3,483,676
HELICOPTER ENGINE AIR INLETS
Donald F. Sargisson, Marblehead, Mass., assignor to General Electric Company, a corporation of New York
Filed Sept. 29, 1967, Ser. No. 671,655
Int. Cl. B64c 23/06, 23/02
U.S. Cl. 55—306                    1 Claim

ABSTRACT OF THE DISCLOSURE

A helicopter powered by a gas turbine engine. The air inlet to the engine is defined by a cowl in advance of the engine. Under normal operation air enters the cowl axially and flows to the engine inlet. Under conditions where contaminants such as sand or salt spray are entrained in the air, as at low altitude hover, the axial entrance to the cowl is closed by blocker doors, and air passes radially into the cowl through filter elements which remove the contaminants and thereby minimize erosion to the engine. Pressure-responsive butterfly valves are provided on the radially directed filter elements, which provide for the free flow of air through the filter elements when the blocker doors are closed and which swing shut when the blocker doors are open and the helicopter is in a forward mode of operation. Closure of the butterfly valves is automatic and provides a smooth flow path along the inner surface of the cowl as well as eliminating distortion of the inlet air due to radial flow.

---

The present invention relates to improvements in air inlets for gas turbine engines employed in the propulsion of helicopters and, more particularly, to improvements in such inlets which are designed to minimize engine erosion resulting from air contaminants such as dirt and salt spray particles.

Serious problems have been encountered in the operation of helicopters, powered by gas turbine engines, at low level hover conditions where dirt, sand, salt spray, and other contaminants are stirred up by the helicopter rotor and ingested into the gas turbine engines. Such contaminants can quickly erode the engine's operating parts and drastically reduce the operating life of the engines. In many instances a cowl is provided to define an inlet passageway in advance of the actual engine inlet at the entrance to the axial flow compressor of such engines. Such a cowl arrangement affords only a minimal protection from contaminant ingestion. It has further been proposed that the normal entrance to the cowl, axially of the engine, be blocked to permit radial in-flow of air through filter elements mounted in the cowl.

This latter arrangement has proven highly effective in minimizing contaminant ingestion in the engine, particularly where the filter elements are of the so-called vortex type. It is recognized that radial in-flow through the cowling results in a measurable loss in engine performance. However, under most conditions such an engine performance loss can be tolerated, and, if not, the pilot has the option of opening the blocker doors to permit axial flow of air to the engine where maximum performance is required, irrespective of the amount of contaminants that might be ingested.

While performance degradation can be accepted on a selected basis to prevent engine erosion, as described above, it is nonetheless desirable that at all other times maximum performance be available. In this connection it has been found that the use of the described filter elements in the cowl results in a turbulence in the air entering the engine when operating with the blocker doors open to permit normal axial flow through the cowl.

The object of the present invention is to provide an improved contaminant-eliminating inlet for gas turbine engines which optimizes engine performance in the operation of helicopters at times other than when the contaminant-eliminating function is required.

These ends are attained in a helicopter having a cowl inlet to a gas turbine engine which provides the motive power for the rotor drive system. The cowl is provided with vortex type separator elements for radial in-flow of air when the normal axial entrance to the cowl is closed off by blocker doors. Valve means on the filter elements permit free radial in-flow of air under these conditions. When the blocker doors are open for axial flow of air to the gas turbine engine, the valve means are pressure responsive to axial flow to shut off radial air flow through the cowl. Preferably the valve means are in the form of butterfly valves which provide a smooth inner surface for the cowl, when closed.

The above and other related objects and features of the invention will be apparent from a reading of the following description of the disclosure found in the accompanying drawing and the novelty thereof pointed out in the appended claim.

In the drawing:

FIGURE 1 is a view of a helicopter in which the present invention is embodied;

FIGURE 2 is an enlarged elevation, with portions broken away, of a cowl defining the inlet for air entering a gas turbine engine used in powering the helicopter;

FIGURE 3 is an axial view of the cowl inlet in a contaminant preventing position;

FIGURE 4 is similar to FIGURE 3 showing the cowl inlet positioned for normal operation;

FIGURE 5 is a section taken on line V—V in FIGURE 3; and

FIGURES 6 and 7 are enlarged sections of filter elements seen in FIGURE 5 illustrating different operating conditions.

FIGURE 1 illustrates a helicopter H of known or conventional design in which the rotors R are powered by gas turbine engines E, each of which has a turbine driven shaft connected to the rotor drive system. In FIGURE 1 only the engine on the near side of the helicopter is shown.

The air inlet to the gas turbine engine is defined by a cowl 14 (FIGURE 2) extending from the fuselage of the helicopter, in advance of the actual engine inlet indicated at 16 (FIGURE 5).

The cowl 14 comprises a front frame 18 and a rear frame 20. The composite structure between the front and rear frame includes an outer screen 22, an outer panel 24, and an inner panel 26. A plurality of cyclonic air separators 28 are mounted on the inner and outer panels 24, 26. The cyclonic air separators 28 (FIGURES 6 and 7) each comprise a vortex tube 30 secured to the outer panel 24 and a conical receiver 32.

When operating under conditions where contaminants such as dirt, salt water, or the like could be ingested into the engine, the axial entrance to the cowl 14 is closed by blocker doors 34, as indicated in FIGURES 3 and 5 by means (not shown) which are actuated at the discretion of the helicopter pilot. With the blocker doors 34 in their closed positions, air enters the cowl 14 in a radial direction through cyclonic air separators 28. The vortex imparted to the air passing through the tubes 30 causes the dirt entrained therein to be discharged into the space between the panels 24 and 26, while the air passing through the receivers 32 is essentially free of contaminants as it then passes into the engine inlet 16. The separated dirt and air may be discharged between the panels 24 and 26 and ultimately discharged overboard as through the vent indicated at 35 in FIGURE 2.

The described arrangement is highly effective in reducing erosion effects of the engine and increasing its available service life. This is accomplished with a minimum of power loss, since contaminant conditions are usually found when a helicopter is at a low level hover position and little or no ram effect would be available, as at a forward cruise condition. In any event the blocker doors 34 may be opened at the pilot's discretion whenever maximum power is desired.

When operating outside a contaminant-containing environment, it is, of course, preferable, especially during forward flight, to have axial flow of air through the cowl to the engine inlet. Again at pilot discretion, the blocker doors 34 would be swung to an open position, as indicated in FIGURE 4 and in phantom in FIGURE 5, for normal forward flight. When this happens, further radial flow of air through the cowl is prevented by butterfly valves 36 which are pivotally mounted by pins 37 at the inner ends of the cyclonic air separators 28, as at the base of the receivers 32. The ram effect of the axial flow of air through the cowl causes a sufficient pressure differential to maintain the butterfly valves in a closed position, as indicated in FIGURE 7. Not only does this prevent radial air flow which might cause turbulence in the air entering the turbine engine, but it also provides an essentially smooth flow path for the air as it passes along the inner surface of the cowl 14. It will also be noted that where operation is under contaminant conditions and the blocker doors 34 are closed, the pivotally mounted butterfly valves 36 provide a minimum impedance to the radial flow of air through the cyclonic air separators 28, as illustrated in FIGURE 6. In this fashion maximum performance can be obtained from the engine operating both under normal and contaminant-containing conditions.

Having thus described the invention, what is claimed as novel and desired to be secured by Letters Patent of the United States is:

1. In a helicopter powered by gas turbine engines, air inlet apparatus comprising,
a cowl of generally frusto-conical form defining an axial inlet at one end aligned with and in advance of the engine inlet and an outlet at the other end, said cowl comprising a front frame, a rear frame, spaced apart inner and outer frusto-conical panels each said panel being supported by said front and rear frames, and panels defining an air space therebetween;
a multiplicity of cyclonic air separators extending radially through said cowl and between said panels for removing contaminants from air passing therethrough, each said cyclone separator comprising an air passage vortex tube secured to said outer panel and including means adapted to impart a vortex flow to the incoming air, and a frusto-conical receiver secured to said inner panel whose small diameter end projects into and is spaced from said vortex tube at a location between said inner and outer panels in such a manner that the contaminants pass between the vortex tube and the conical receiver into the said air space and the clean air passes into the small diameter end of the frusto-conical receiver;
blocker door means connected to the axial air inlet of the cowl and movable between a first position for allowing axial air flow through the inlet and a second position for preventing such air flow; and
valve means pivotally mounted at the base of each frusto-conical receiver adjacent said inner panel, said valve means comprising butterfly valve elements pivoted in an unbalanced manner and adapted to close cyclonic separators to the passage of air and form an essentially smooth flow path with the interior surface of said inner panel when said blocker doors are opened.

References Cited

UNITED STATES PATENTS

| | | | |
|---|---|---|---|
| 1,333,325 | 3/1920 | McGee | 55—348 |
| 1,864,201 | 6/1932 | Kegerreis et al. | 55—313 |
| 2,158,273 | 5/1939 | Chilton | 55—306 |
| 2,209,339 | 7/1940 | Knight | 55—344 |
| 2,210,270 | 8/1940 | Thwaites | 55—314 |
| 2,216,390 | 10/1940 | Hawley | 55—347 |
| 2,368,787 | 2/1945 | Skinner | 55—213 |
| 2,381,705 | 8/1945 | Vokes | 55—306 |
| 2,583,921 | 1/1952 | Yellott et al. | 55—306 |
| 2,836,256 | 5/1958 | Caskey | 55—293 |
| 3,061,109 | 1/1962 | Howard | 55—312 |
| 3,030,755 | 4/1962 | Farr et al. | 55—456 |
| 3,135,487 | 6/1964 | Kottsieper | 55—306 |
| 3,360,005 | 12/1967 | Sopher et al. | 55—306 |
| 3,362,155 | 1/1968 | Driscoll | 55—306 |
| 3,383,841 | 5/1968 | Olson et al. | 55—337 |
| 2,731,102 | 1/1956 | James | 55—348 |
| 3,421,296 | 1/1969 | Beurer | 55—348 |

FOREIGN PATENTS

| | | |
|---|---|---|
| 124,101 | 4/1947 | Australia. |
| 701,593 | 12/1953 | Great Britain. |

HARRY B. THORNTON, Primary Examiner

BERNARD NOZICK, Assistant Examiner

U.S. Cl. X.R.

55—309, 337, 348, 457; 60—39.09